March 5, 1946.   F. M. LEWIS   2,395,888
SHAFT RESTRAINING DEVICE
Filed July 10, 1943
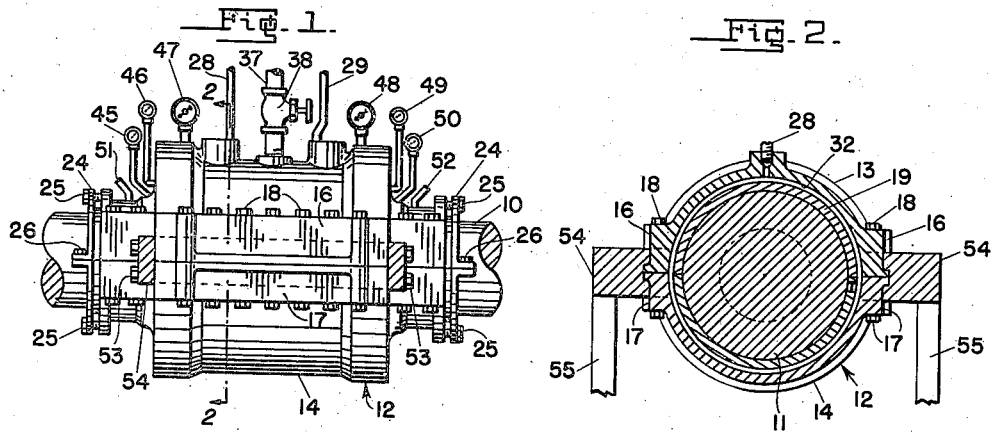
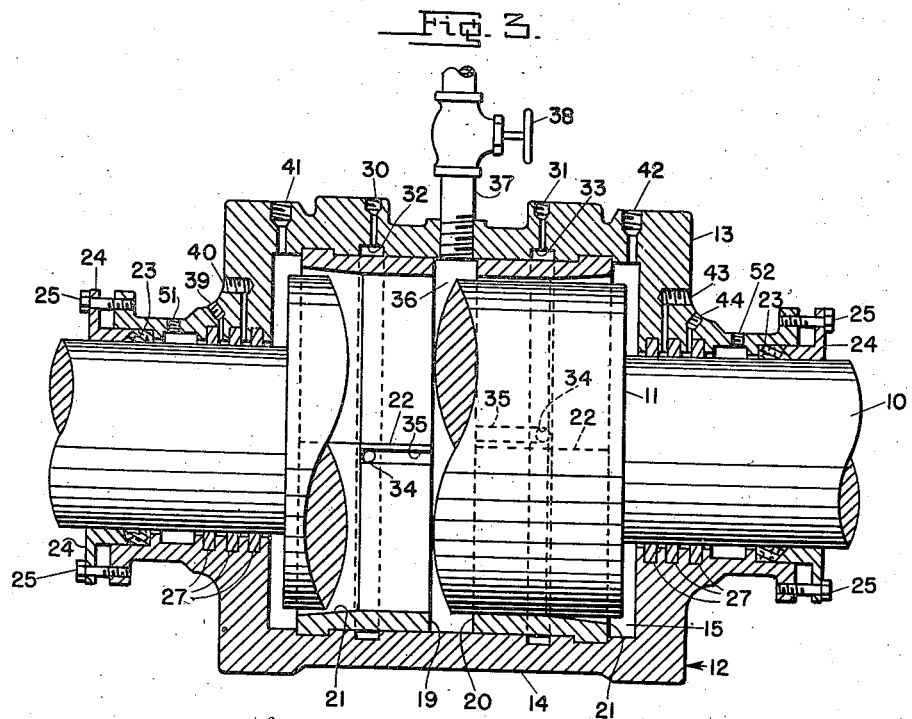
INVENTOR.
Frank M. Lewis
BY
ATTORNEY.

Patented Mar. 5, 1946

2,395,888

UNITED STATES PATENT OFFICE 2,395,888

SHAFT RESTRAINING DEVICE

Frank M. Lewis, Weston, Mass.

Application July 10, 1943, Serial No. 494,201

4 Claims. (Cl. 188—96)

(Granted under the act of March 3, 1883, as amended April 30, 1928; 370 O. G. 757)

The invention relates to a device for restraining high frequency axial movement of a shaft subject to high frequency forces, such as the propeller shaft of a ship.

The axial thrust exerted by the screw propeller of a ship ordinarily is transmitted along the propeller shaft to the ship structure through a thrust bearing at the forward end of the propeller shaft. The propeller shaft is subjected not only to a substantially steady forward thrust but also to objectionable high frequency axial movements which tend to cause vibration in the ship structure and which may cause excessive wear or damage in the main thrust bearing.

It is, therefore, the primary object of the present invention to provide a propeller shaft with a device which will resist high frequency axial movement of the shaft without appreciably interfering with the transmission of substantially steady forward thrust therealong.

Another object of the invention is to provide a propeller shaft with means for transferring any high frequency axial forces from the shaft to the ship structure in a zone where such high frequency forces may be received with less possibility of causing damage or objectionable vibration in the ship.

A further object of the invention is the provision of a viscous damper adapted to limit the motions of the propeller-shaft-engine system markedly at resonance.

Other objects and advantages of the invention will become apparent during the course of the following detailed description, taken in connection with the accompanying drawing, forming a part of this specification, and in which drawing, Figure 1 is a side elevational view of the restraining device, with portions of its supporting structure shown in vertical section.

Figure 2 is a vertical transverse sectional view taken substantially on the line 2—2 of Figure 1.

Figure 3 is a central vertical longitudinal sectional view of the restraining device.

On the drawing, which for the purpose of illustration, shows only a preferred embodiment of the invention, and wherein similar reference characters denote corresponding parts throughout the several views, the numeral 10 designates the propeller shaft of the ship, provided with a fixed cylindrical enlargement hereinafter referred to as a piston 11, preferably integral with the propeller shaft.

Surrounding the piston 11 is a cylindrical housing 12 which may include upper and lower halves 13, 14, defining a chamber 15 and provided along their meeting edges with longitudinal flanges 16, 17 clamped together as by bolts 18.

A small clearance, averaging on the order of 0.004 inch for a ship installation, is maintained about the piston 11. Due to strength requirements, the principal elements of the device are ordinarily made of steel. Since the parts are heavy and the clearance about the piston is small, surface contact between the piston 11 and the lower half of the housing 12 would be practically unavoidable. For this reason, the chamber 15 is made of a diameter greater than that of the piston 11, and bearing sleeves or liners 19, 20 that provide the desired clearance about the piston are fixed within the housing. The sag of the piston 11 due to its weight is somewhat exaggerated in Figure 3 and in light weight constructions would not be appreciable. However, this sag does not seriously affect the operation of the device although it may eliminate, except for the thickness of a film of oil, the clearance between the piston 11 and the lower half 14 of the housing 12.

These liners 19, 20, are tapered in thickness outwardly from about midway of their widths, as indicated at 21, so as to take care of possible axial misalignment of the propeller shaft 10 and the housing 12. In order to facilitate assembly, the liners are split, as indicated at 22.

The opposite ends of the housing 12 are sealed about the shaft in any convenient manner. In the example shown in Figure 3, the housing ends are each provided with stuffing boxes 23 equipped with glands 24 adjustable as by cap screws 25. For ease of assembly on shipboard, the glands 24 are of the split type, removably secured together, as by cap screws 26. Disposed in encircling relation to the shaft 10 and inwardly of the stuffing boxes 23 are sealing rings 27. In the example shown in Figure 3, each end of the housing 12 is provided with three rings 27, but any desired number of rings may be used.

In order that oil under pressure may be circulated through the housing 12, oil supply pipes 28, 29 are connected to inlet ports 30, 31 that communicate with annular grooves 32, 33 formed in the housing in encircling relation to the liners 19, 20. At least one hole 34 is bored through the untapered portion of each liner in a manner to permit the passage of oil from the grooves 32, 33 to channels 35 which extend into the annular space 36 between the liners 19, 20. Communicating with the space 36 is an outlet pipe 37 provided with a control valve 38 adjustable to regulate the pressure of the oil which fills the housing 12. The pumping means for maintaining pressure within the housing will vary with the application, but for installation on a large propellor shaft, about 200 pounds per square inch is satisfactory. Under operating conditions, this pressure may increase to 1,000 pounds per square inch, or more. In order that the oil in the chamber remain free of bubbles and substantially incompressible, every effort should be made to eliminate any surface irregularities in the various parts which would create a turbulent condition during rotation of the shaft.

Connected to suitably located openings 39—44 in the housing 12 are gages 45—50 for indicating the hydraulic pressure at various points in the system. Since oil from the space 36 is forced both fore and aft between the piston 11 and liners 19, 20, and tends to find its way past the sealing rings 27, I provide outlet openings 51, 52 at each end of the housing beyond the outermost sealing rings 27 so that any excess oil may be drawn off.

The means for supporting the housing 12 will necessarily be designed to suit the application, and in marine installations will vary from ship to ship. In any case, however, the housing should be secured very rigidly to supporting structure disposed in a plane intersecting the longitudinal axis of the shaft, or symmetrically about such a plane, otherwise, axial shaft movements will tend to force the housing out of its proper parallel relation to the shaft. In the example shown, the housing 12 is very rigidly secured, as by bolts 53, between spaced parallel beams 54 and supporting members 55 which are disposed longitudinally of the ship.

The variable thrusts must find their reaction either in the inertia of the propelling system or in the ship hull itself. Since the viscous damper reduces the motion of the propelling system, it reduces the inertia reaction and the main reaction must come from the hull itself. This reaction is in the support of the viscous damper cylinder which must be attached to the hull in such a position that no objectionable resonances arise because of the introduction of the additional structure. This means that the viscous damper must be mounted as rigidly and as directly as possible on strong longitudinal members of the ship's hull. Cantilever effects and the transmission of reaction through bending structures should be avoided. The more directly the variable forces act on compression members, the less the possibility of ship vibration troubles.

Enough clearance, an inch perhaps, is provided in the chamber 15 at each end of the piston 11 to permit axial movement of the shaft relative to the housing 12. The oil confined in either end of the chamber 15 may gradually flow through the restricted space between the piston 11 and the liners 19, 20 so that the substantially steady axial thrust developed by the propeller is transmitted to the usual thrust bearing at the forward end of the shaft. Any rapid high-frequency axial movement of the shaft 10 will be resisted by the oil confined between the ends of the piston 11 and the housing 12, since the oil is substantially incompressible and its flow between opposite ends of the chamber 15 is restricted by the relatively small clearance between the piston 11 and the liners 19, 20, thus, any objectionable high-frequency axial forces in the shaft are taken by the housing 12 and by the longitudinal structural members of the ship in a zone where such forces will not tend to cause damage or undesirable vibration in the ship.

Various changes may be made in the form of invention herein shown and described without departing from the spirit of the invention or the scope of the following claims.

The invention described herein may be manufactured and used by or for the Government of the United States of America for governmental purposes without the payment of any royalties thereon or therefor.

I claim:

1. In combination with a rotatable propeller shaft subject to high frequency axial movements, a piston fixed to the shaft and in coaxial alignment therewith, a cylinder surrounding the piston and of a length to permit reciprocation of the piston longitudinally of the cylinder, annular bearing means disposed within the cylinder intermediate the ends thereof and forming oil chambers in the opposite end portions of the cylinder, said bearing means including inside cylindrical surfaces of uniform internal diameter providing a slight clearance about the piston inwardly of its ends and inside tapering surfaces providing increasing clearance toward the ends of the piston, means for introducing oil into the cylinder, and means for rigidly securing the cylinder against rotation and axial movement.

2. In combination with a rotatable propeller shaft subject to high frequency axial movements, a piston fixed on the shaft, a cylinder surrounding the piston and of a length to permit reciprocation of the piston longitudinally of the cylinder, spaced annular liners disposed within the cylinder intermediate the ends thereof and forming oil chambers one in each end portion of the cylinder and one intermediate said end portions, said liners providing a slight clearance around the piston permitting restricted passage of oil between said oil chambers, means for maintaining oil under pressure in said chambers, and means for rigidly securing the cylinder against rotation and axial movement.

3. In combination with a rotatable propeller shaft subject to high frequency axial movements, a piston fixed on the shaft, a cylinder surrounding the piston and of a length to permit reciprocation of the piston longitudinally of the cylinder, spaced annular liners disposed within the cylinder intermediate the ends thereof and forming chambers one in each end portion of the cylinder and one intermediate said end portions, said liners providing a slight clearance around the piston permitting restricted passage of oil between said oil chambers, said cylinder provided with annular grooves encircling the liners, means for introducing oil into said grooves, said liners provided with oil channels communicating with the oil chamber intermediate said end portions, and with oil ducts between said grooves and channels, said cylinder provided with an oil outlet, and means for rigidly securing the cylinder against rotation and axial movement.

4. In combination with a rotatable propeller shaft subject to high-frequency axial movements, a piston fixed to the shaft and in coaxial alignment therewith, a cylinder surrounding the piston and of a length to permit reciprocation of the piston longitudinally of the cylinder, spaced annular liners disposed within the cylinder intermediate the ends thereof and forming oil chambers in the opposite end portions of the cylinder, said liners including inner portions of uniform internal diameter providing a small clearance about the piston, and outer tapering portions of increasing internal diameter, means for introducing oil into the cylinder, and means for rigidly securing the cylinder against rotation and axial movements.

FRANK M. LEWIS.